US008205073B2

(12) United States Patent  
Ishidoshiro

(10) Patent No.: US 8,205,073 B2  
(45) Date of Patent: Jun. 19, 2012

(54) ACCESS POINT, TERMINAL, ENCRYPTION KEY CONFIGURATION SYSTEM, ENCRYPTION KEY CONFIGURATION METHOD, AND PROGRAM

(75) Inventor: Takashi Ishidoshiro, Nagoya (JP)

(73) Assignee: Buffalo Inc., Nagoya-Shi (JP)

( * ) Notice: Subject to any disclaimer, the term of this patent is extended or adjusted under 35 U.S.C. 154(b) by 1440 days.

(21) Appl. No.: 10/982,031

(22) Filed: Nov. 5, 2004

(65) Prior Publication Data

US 2005/0160138 A1     Jul. 21, 2005

(30) Foreign Application Priority Data

Nov. 7, 2003   (JP) .................................. 2003-378322

(51) Int. Cl.
*H04L 29/06*     (2006.01)
(52) U.S. Cl. ........................................ 713/153
(58) Field of Classification Search .................... 713/153
See application file for complete search history.

(56) References Cited

U.S. PATENT DOCUMENTS

| 2003/0051140 A1 | 3/2003 | Buddhikot et al. | |
|---|---|---|---|
| 2003/0154287 A1 | 8/2003 | Sullivan | |
| 2003/0169713 A1* | 9/2003 | Luo | 370/338 |
| 2005/0057955 A1* | 3/2005 | Oikawa | 365/145 |

FOREIGN PATENT DOCUMENTS

| JP | 2001-320373 | 11/2001 |
|---|---|---|
| JP | 2001-345819 | 12/2001 |

OTHER PUBLICATIONS

"SpectrumSoft Wireless Network Management System," Jun. 30, 2000, Symbol Technologies, Inc.
European Search Report dated May 20, 2005, from corresponding EPC Application No. 04256869.1.
Korean Office Action dated Jun. 22, 2006 from corresponding Korean Application.
CRC Press, Inc., Handbook of Applied Cryptography, 1997, Chapter 12, §12.6, pp. 515-524.

* cited by examiner

*Primary Examiner* — Nasser Goodarzi
*Assistant Examiner* — Daniel Hoang
(74) *Attorney, Agent, or Firm* — Beyer Law Group LLP

(57) ABSTRACT

An object of the present invention is to enable the configuration tasks needed to form a wireless LAN to be performed using a simple method while increasing security during such configuration. In a wireless network configuration system GH1 including an encryption key setting system LH1, where an access point 20 determines after the power thereto is turned ON that configuration for connection to a wireless LAN has not yet be carried out, the access point 20 activates a restricted receiving mode in which only an initial configuration packet is accepted. A terminal 50 that has sent an initial configuration packet and the access point 20 that has received such initial configuration packet while the restricted receiving mode is active each create an identical WEP key with reference to the data on a CD-ROM 51 or the data in a ROM 12, respectively, and set and register the created WEP key in itself.

19 Claims, 8 Drawing Sheets

ACCESS POINT, TERMINAL, ENCRYPTION KEY CONFIGURATION SYSTEM, ENCRYPTION KEY CONFIGURATION METHOD, AND PROGRAM

BACKGROUND OF THE INVENTION

1. Field of the Invention

The present invention relates to a technology to configure in an access point and terminal an encryption key used to encode data transmitted wirelessly between the access point comprising a wireless LAN transponder and the terminal that includes a LAN connection device.

2. Description of the Related Art

Various wireless LAN security technologies that prevent unauthorized network access or leakage to third parties of the contents of communications have been proposed in the conventional art. For example, a technology (hereinafter referred to as 'MAC address restriction' technology) has been proposed whereby a MAC (Media Access Control) address that constitutes a unique ID signal pre-assigned to a wireless LAN connection device (such as a wireless LAN adapter) installed in a terminal is registered with an access point, the access point authenticates the MAC address at the time of terminal access, and a request for network access from a terminal having a MAC address different from the registered MAC address is denied (see, for example, Japanese Patent Laid-Open No. 2001-320373). A technology (hereinafter referred to as 'WEP encoding') has also been proposed whereby a WEP (Wired Equivalent Privacy) key using a desired text string is registered as a common encryption key for both the terminal and the access point and the contents of data exchanged between the terminal and the access point are encrypted using this WEP key, such that even if the data leaks, the contents of the data are difficult to interpret and the data cannot be understood (see, for example, Japanese Patent Laid-Open No. 2001-345819).

However, in the conventional technologies described above, when the terminal seeks to connect to the wireless LAN, the registration of the MAC address with the access point or the setting of the WEP key in the access point and the terminal must be performed manually, making the wireless LAN configuration operations cumbersome and inconvenient. Particularly in the case of a so-called 'free spot' that provides an Internet connection by making an access point available in a public space, large numbers of persons want to use the free spot, and their numbers are increasing steadily. Requiring all of these persons who bring their own terminals to perform complex terminal operations such as MAC address registration and WEP key setting as a condition of using the free spot would be extremely inconvenient and impractical.

Furthermore, because the WEP key can serve as a clue to assist in the interpretation of the data exchanged between the terminal and the access point, the newly proposed wireless LAN configuration method must incorporate sufficient measures to prevent the WEP key from leaking during the configuration process and to preserve the confidentiality of the terminal user's communications.

SUMMARY OF THE INVENTION

Accordingly, an object of the present invention is to resolve some of the problems described above and enable required configuration operations when forming a wireless LAN to be carried out using a simple method while increasing security via the following construction.

The access point of the present invention is an access point that connects to terminals to network through a wireless LAN connection device equipped on said terminals, said access point comprising:

an operation receiving unit that receives a prescribed operation;

a detection unit that detects a status of a connection configuration required for connection to the network, when said prescribed operation is received by said operation receiving unit;

a mode activation unit that, when the detected status of the connection configuration indicates that the connection configuration remain to be performed, activates a restricted receiving mode in which only a packet including information specific to one of said terminals is accepted as an initial configuration packet;

a terminal identification unit that, when said initial configuration packet sent from a first terminal among said terminals is received while the restricted receiving mode is active, identifies the first terminal that sent the initial configuration packet based on said terminal-specific information;

an encryption key setting unit that, prior to the commencement of subsequent communications with said first terminal identified by said terminal identification unit, sets a first encryption key to be used for communications with said first terminal to a value corresponding to an encryption key set in said first terminal, using said terminal-specific information; and a communication unit that performs wireless communication with said first terminal while decoding wireless communication data using said first encryption key.

The above wireless LAN connection device is a device that is installed in a terminal in order to enable wireless communication between the terminal and an access point. An example of this wireless LAN communication device is a wireless LAN adapter or a wireless LAN card. Furthermore, examples of the terminal-specific information included in the initial configuration packet may include a MAC address, a CPU ID (processor serial number), a random number generated by the terminal, information regarding the time at which the terminal performed a prescribed operation, or a combination thereof.

When a prescribed operation is performed, the access point of the present invention detects a status of a connection configuration required for connection to the network. When the detected status of the connection configuration indicates that the connection configuration remain to be performed, the access point activates a restricted receiving mode in which only an initial configuration packet that contains terminal-specific information is accepted. When an initial configuration packet sent from the first terminal is received while this restricted receiving mode is active, the terminal identification unit identifies the first terminal that sent the initial configuration packet based on the terminal-specific information included therein, and prior to communication with the identified first terminal, the encryption key setting unit sets, using the terminal-specific information, an encryption key to be used for communications with the first terminal to a value corresponding to the encryption key set in the first terminal that sent the initial configuration packet. Therefore, the owner of the first terminal can set in the first terminal and the access point the encryption key to be used therebetween by instructing from the first terminal that such initial configuration packet be sent. Moreover, because the setting of this encryption key is carried out internally by the first terminal and the access point, the first terminal and the access point need not have a wireless exchange of data regarding the encryption key to set such encryption key to be used therebetween, so there is no risk that the encryption key data will be obtained by a third party via interception of wireless radio waves. Therefore, an encryption key required for creation of a wireless LAN may be set easily while preventing the leakage of data pertaining to such encryption key.

The above restricted receiving mode may comprise a mode in which the access point stands by for an initial configuration packet without issuing beacon signals used for position confirmation. This makes it difficult to ascertain the position of the access point. Therefore, the unauthorized interception of security data targeting the access point can be prevented.

It is also preferred that the access point of the present invention include display unit that provides a visual display that the restricted receiving mode is active. This allows the terminal owner to easily determine that the access point is in a state in which a wireless LAN can be formed.

It is furthermore preferred that the access point of the present invention comprises a mode switching unit that, following the encryption key setting, switches the active mode from said restricted receiving mode to a wireless communication mode that said access point communicates with said first terminal; and a connection configuration unit that, following switching to said wireless communication mode, when connection configuration data pertaining to the settings for connection to the network is transmitted while encoded using the encryption key set in said first terminal, receives said connection configuration data, decodes said connection configuration data using the first encryption key set by said encryption key setting unit and configures the network connection for said first terminal based on the decoded connection configuration data. In this case, the network connection between the access point and the first terminal can be automatically configured following the setting of the encryption key. Furthermore, because the network connection configuration data is transmitted wirelessly from the first terminal to the access point after being encoded using the previously-set encryption key valid between the first terminal and the access point, it is difficult for the connection configuration data to be interpreted via interception of the wireless radio waves. Therefore, the network connection configuration required for creation of the wireless LAN can be carried out easily with a high level of security.

Examples of this connection configuration data include information identifying the individual networks in the wireless LAN (such as ESS ID (Extended Service Set ID), the type of circuit to be connected to the WAN (Wide Area Network) (such as xDSL, CATV or optical fiber) or data indicating the contents of the contract with the ISP (hereinafter 'contract data'). This contract data may comprise information identifying the computer on the WAN (such as the IP address used in the TCP/IP network), the user name used for authentication for connection to the WAN (as when PPPoE is used, for example), or password information.

It is also preferred that the access point of the present invention comprises an encoded data receiving unit that, following the setting of the first encryption key, when an initial configuration packet that includes a second information specific to a second terminal among said terminals is sent from said second terminal for which an encryption key used for communications with said access point has not yet been set, receives additional registration data that includes said second terminal-specific information for said second terminal is sent from said first terminal that received said initial configuration packet, after being encoded using the first encryption key that is already set and used for communications between said access point and said first terminal, receives this additional registration data; an additional terminal identification unit that decodes the received additional registration data using the encryption key set by said encryption key setting unit and identifies said second terminal that sent said initial configuration packet based on said second terminal-specific information included in the decoded additional registration data; and an additional setting unit that, prior to communication with said identified second terminal, sets a second encryption key to be used for communications with said second terminal to a value corresponding to an encryption key set in said second terminal using said terminal-specific. In this case, where a second terminal is to be newly added as a terminal to use a LAN, the owner of the second terminal can set in the access point and the second terminal an encryption key that will be used for communications therebetween simply by instructing the second terminal to send an initial configuration packet. Moreover, because the setting of this encryption key is carried out internally by the second terminal and the access point, the second terminal and the access point need not have a wireless exchange of data regarding the encryption key in order to set such encryption key to be used therebetween, so there is no risk that the encryption key data will be obtained by a third party via interception of the wireless radio waves. Therefore, even where a terminal to use a wireless LAN is newly added, an encryption key required for wireless LAN creation may be set easily while preventing the leakage of data pertaining to such encryption key.

It is also preferred that the access point of the present invention further comprises an additional connection configuration unit that, following the setting of the encryption key by said additional setting unit, when connection configuration data pertaining to the settings for connection to the network is sent from said second terminal after being encoded using the encryption key set in said second terminal, receives this connection configuration data, decodes said connection configuration data using the second encryption key set by said additional setting unit and executes the connection configuration for said second terminal based on the decoded connection configuration data. In this case, configuration regarding connection to the network can be carried out automatically between the access point and the second terminal following setting of the encryption key. Furthermore, because the connection configuration data pertaining to the network connection settings is sent wirelessly from the second terminal to the access point while encoded using the previously-set encryption key valid between the second terminal and the access point, it is difficult to interpret the connection configuration data via interception of the wireless radio waves. Therefore, even where a terminal to use a wireless LAN is newly added, the network connection configuration operations required to form a wireless LAN can be carried out easily with a high level of security.

It is also acceptable if the initial configuration packet sent from a terminal is encoded using a temporary key comprising an encryption key used temporarily, and the access point includes storage unit that stores in advance a provisional key comprising an encryption key used to decode the encoded initial configuration packet, as well as information retrieval unit that, when the terminal identifying unit or additional terminal identifying unit receives an initial configuration packet from either the first or second terminal that is encoded by a temporary key, retrieves the terminal-specific information contained in the initial configuration packet by decoding the initial configuration packet using the stored provisional key. In this case, because the initial configuration packet that includes the terminal-specific information is sent wirelessly to the access point from the first or second terminal while encoded using the temporary key, it is difficult to interpret the terminal-specific information via interception of the wireless radio waves. Therefore, unauthorized network access using the terminal-specific information for another person can be prevented.

It is also preferred that the value of the encryption key set by the encryption key setting unit or the additional setting unit be determined in association with the time at which the initial configuration packet was sent from the first or second terminal. In this case, it becomes extremely difficult to interpret the encryption key set in the access point and the first and second terminals, further increasing the degree of security of the wireless communications between the access point and each terminal.

The present invention may comprise a terminal that includes a wireless LAN connection device and carries out wireless communication between such device and the above access point using wireless communication data encoded using a prescribed encryption key. This terminal comprises a transmission unit that wirelessly transmits an initial configuration packet that includes information specific to said terminal based on a prescribed instruction; and a setting unit that, prior to the exchange of data via wireless communication with said access point that receives said terminal-specific information included in said initial configuration packet sent by said transmission unit, sets the encryption key used for communications with said access point using said terminal-specific information. After transmission of the initial configuration packet, the terminal sets the encryption key in itself using the terminal-specific information included in the initial configuration packet. If the access point-side encryption key is set to correspond to the encryption key set in the above manner, there is no need for a wireless exchange of encryption key data between the terminal and the access point in order to set the encryption key to be used between the terminal and the access point, thereby eliminating the risk that the encryption key data will leak to a third party via interception of the wireless radio waves. As a result, the encryption key configuration operations required for creation of a wireless LAN can be carried out easily while preventing the leakage of data that would reveal the encryption key.

A construction also may be adopted wherein the transmission of an initial configuration packet by the transmission unit is executed when a prescribed program is booted on the terminal. In this case, the encryption key can be reliably set in the terminal and in the access point even where the terminal owner has only a limited understanding of networks.

A first encryption key setting system of the present invention is implemented in the way of above described an access point and a terminal invention.

An encryption key setting method that uses the technology of the first encryption key setting system described above may also be implemented.

According to the first encryption key setting system and first encryption key setting method of the present invention, since the setting of this encryption key is carried out internally by the first terminal and the access point, the terminal and the access point need not have a wireless exchange of data regarding the encryption key itself to be used therebetween, so there is no risk that the encryption key data will be obtained by a third party via interception of the wireless radio waves. As a result, the encryption key configuration operations required for creation of a wireless LAN can be carried out easily while preventing the leakage of data that would reveal the encryption key.

Various embodiments of the first encryption key setting system and first encryption key setting method described above may be envisioned. While the encryption key setting system is described below as an example, the same embodiment may be implemented as an encryption key setting method. Naturally, the various embodiments of the invention pertaining to the access point described above may be applied to the invention pertaining to the encryption key setting system and encryption key setting method.

In the first encryption key setting system described above, a construction may also be adopted in which the terminal comprises a connection configuration data transmission unit that, following setting of the encryption key by said setting unit, transmits connection configuration data pertaining to the settings for connection to the network after encoding said data using the encryption key set in said terminal. On the other hand, the access point comprises: a mode switching unit that, after the first encryption key is set by said encryption key setting unit, switches the active mode from said restricted receiving mode to a wireless communication mode in which said access point can communicate wirelessly with said terminal; and a connection configuration unit that, when connection configuration data transmitted from said first terminal is received following the switching to said wireless communication mode, decodes said connection configuration data using the encryption key and configures the network connection for said first terminal based on the decoded connection configuration data. In this case, the network connection between the access point and the terminal can be automatically configured following the setting of the encryption key. Furthermore, because the network connection configuration data is transmitted wirelessly from the terminal to the access point after being encoded using the previously-set encryption key valid between the terminal and the access point, it is difficult for the connection configuration data to be interpreted via interception of the wireless radio waves. Therefore, the network connection configuration operations required for creation of the wireless LAN can be carried out easily with a high level of security.

In the first encryption key setting system described above, terminals include a first terminal for which the first encryption key valid between said terminal and said access point is already set and a second terminal for which an encryption key valid between said terminal and said access point is not yet set. The first terminal further comprises: a packet receiving unit that receives an initial configuration packet that was sent from said second terminal and includes information specific to said second terminal; and an additional registration data transmission unit that, following the receipt of said initial configuration packet, transmits to said access point additional registration data that includes said information specific to said second terminal after encoding said data using the encryption key valid between said first terminal and said access point. The access point further comprises: an additional terminal identification unit that receives said additional registration data, decodes said data using the first encryption key, and identifies said second terminal that sent said initial configuration packet based on said terminal-specific information included in the decoded additional registration data; and an additional setting unit that, prior to communication with said identified second terminal, sets a second encryption key used for communications with said second terminal to a value corresponding to an encryption key set in said second terminal, using said second terminal-specific information. In this case, where a second terminal is to be newly added as a terminal to use a LAN, the owner of the second terminal can set in the access point and the second terminal the encryption key that will be used for communications therebetween simply by instructing the second terminal to send an initial configuration packet. Furthermore, because the setting of this encryption key is carried out internally by the second terminal and the access point, the second terminal and the access point need not have a wireless exchange of data regarding the encryption key to be used therebetween, so there is no risk that the encryption key data will be obtained by a third party via interception of the wireless radio waves. Therefore, even where a terminal to use a wireless LAN is newly added, an encryption key required for creation of a wireless LAN may be set easily while preventing the leakage of data pertaining to such encryption key.

It is also preferred that the second terminal comprises an additional connection configuration data transmission unit that, after said additional setting unit in said second terminal sets the second encryption key for communication with said second terminal, transmits connection configuration data pertaining to the network connection settings while encoding the data using the encryption key set in said second terminal. The access point further comprises an additional connection configuration unit that receives said connection configuration data sent from said second terminal, decodes said connection configuration data using the second encryption key set by said additional setting unit and executes the connection configuration for said second terminal based on the decoded connection configuration data. In this case, configuration regarding connection to the network can be carried out automatically between the access point and the second terminal following setting of the encryption key. Furthermore, because the network connection configuration data is sent wirelessly from the second terminal to the access point while encoded using the previously set encryption key valid between the second terminal and the access point, it is difficult to interpret the connection configuration data via interception of the wireless radio waves. Therefore, even where a terminal to use a wireless LAN is newly added, an encryption key required for creation of a wireless LAN may be set easily while preventing the leakage of data pertaining to such encryption key.

The technology of the above invention can also be implemented as a program invention. The program of the present invention describes the operations performed by at least one of the access point and terminals in a format that can be read by a computer. The same operation and effects described above can be achieved via the loading and execution of this program on a computer that incorporates the access point or one of the terminals.

The second encryption key setting system of the present invention is an encryption key setting system that sets in an access point that comprises a wireless LAN transponder and in a terminal that includes a wireless LAN connection device an encryption key used when wireless communication data that is exchanged wirelessly between the access point and the terminal is encoded prior to such data exchange. The system comprises an RFID tag that includes an RFID chip having a communication range that is narrower than the wireless communication range for the wireless communication data, and that stores information pertaining to the encryption key valid between said terminal and said access point; wherein said access point and said terminal each comprise: an information retrieval unit that retrieves the encryption key information stored in said RFID tag; and an setting unit that sets in its own device the encryption key valid between said terminal and said access point based on said information retrieved by said information retrieval unit.

The second encryption key setting system of the present invention includes an RFID tag that comprises an RFID chip having a communication range that is smaller than the wireless communication range for the wireless communication data and stores information pertaining to the encryption key valid between the terminal and the access point. RFID (Radio Frequency Identification) is a mechanism for carrying out identification of individual devices or items and data transmission and receipt by transmitting radio waves to an RFID tag comprising a chip containing an IC and an antenna and reading the information stored in the IC of the RFID tag. By using RFID, the encryption key data can be transmitted wirelessly within the small RFID communication range simply by placing an RFID tag in the small RFID communication range, and the encryption key can be set in the access point and the terminal via such transmission. Therefore, the wireless setting of the encryption key in the access point and the terminal can be achieved using the simple method of bringing the RFID tag close to the access point and the terminal, while maintaining a high level of security in order to prevent the leakage of the WEP key.

DETAILED DESCRIPTION OF THE PREFERRED EMBODIMENTS

In order to further clarify the construction and operation of the present invention described above, embodiments of the invention are described below according to the following sequence.

A. First embodiment (wireless network configuration system GH1)
   A-1. Basic description of wireless network configuration system GH1
   A-2. Processing executed in wireless network configuration system GH1
   A-2-1. Security data setting routines
   A-2-2. Connection configuration routines
   A-3. Operation and effects B. Second embodiment
C. Modifications

A. First Embodiment

A-1. Basic Description of Wireless Network Configuration System GH1

Figure 1:
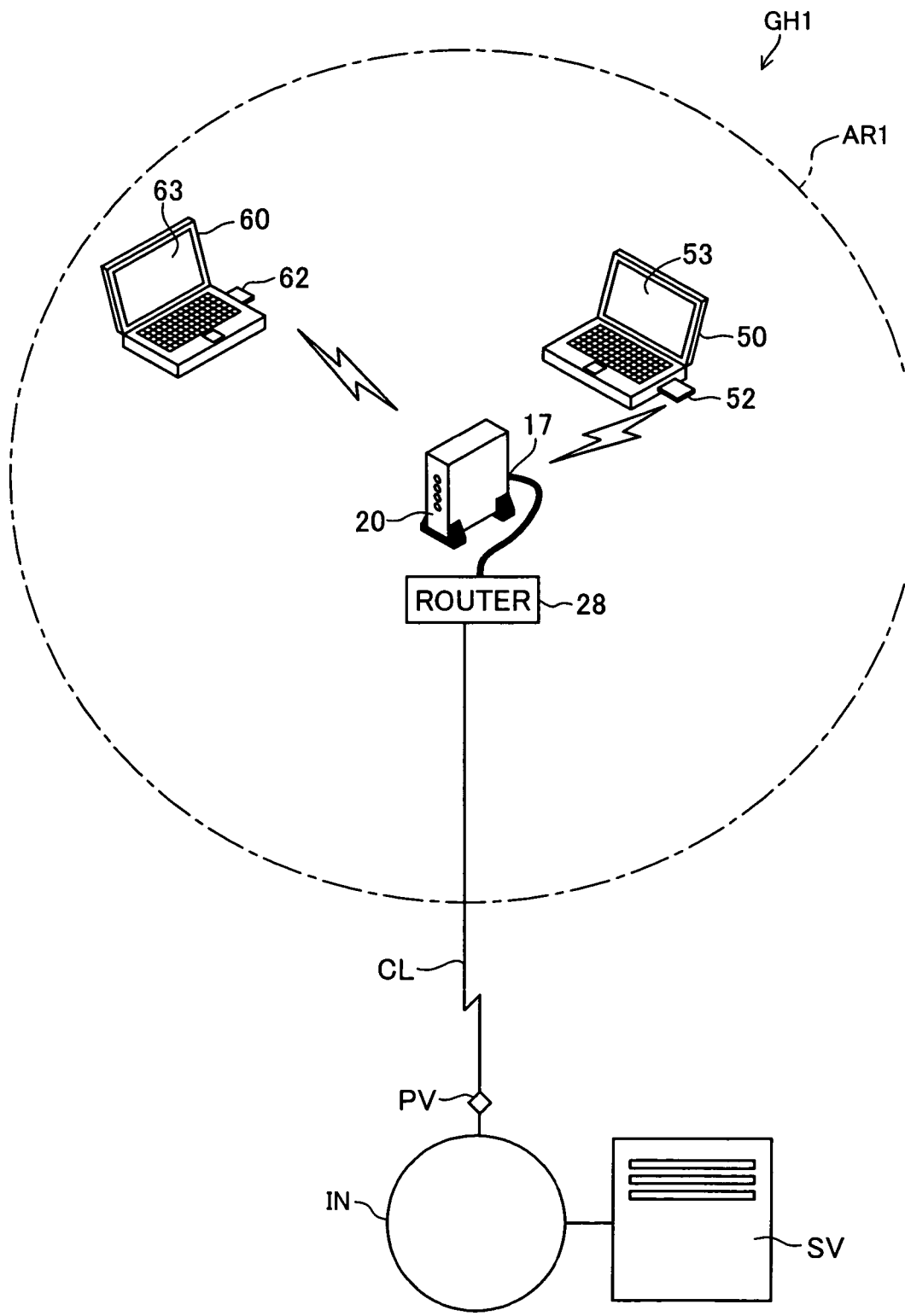
FIG. 1 is an explanatory drawing showing the hardware construction to realize a wireless network configuration system GH1 comprising a first embodiment of the present invention.
Figure 2:
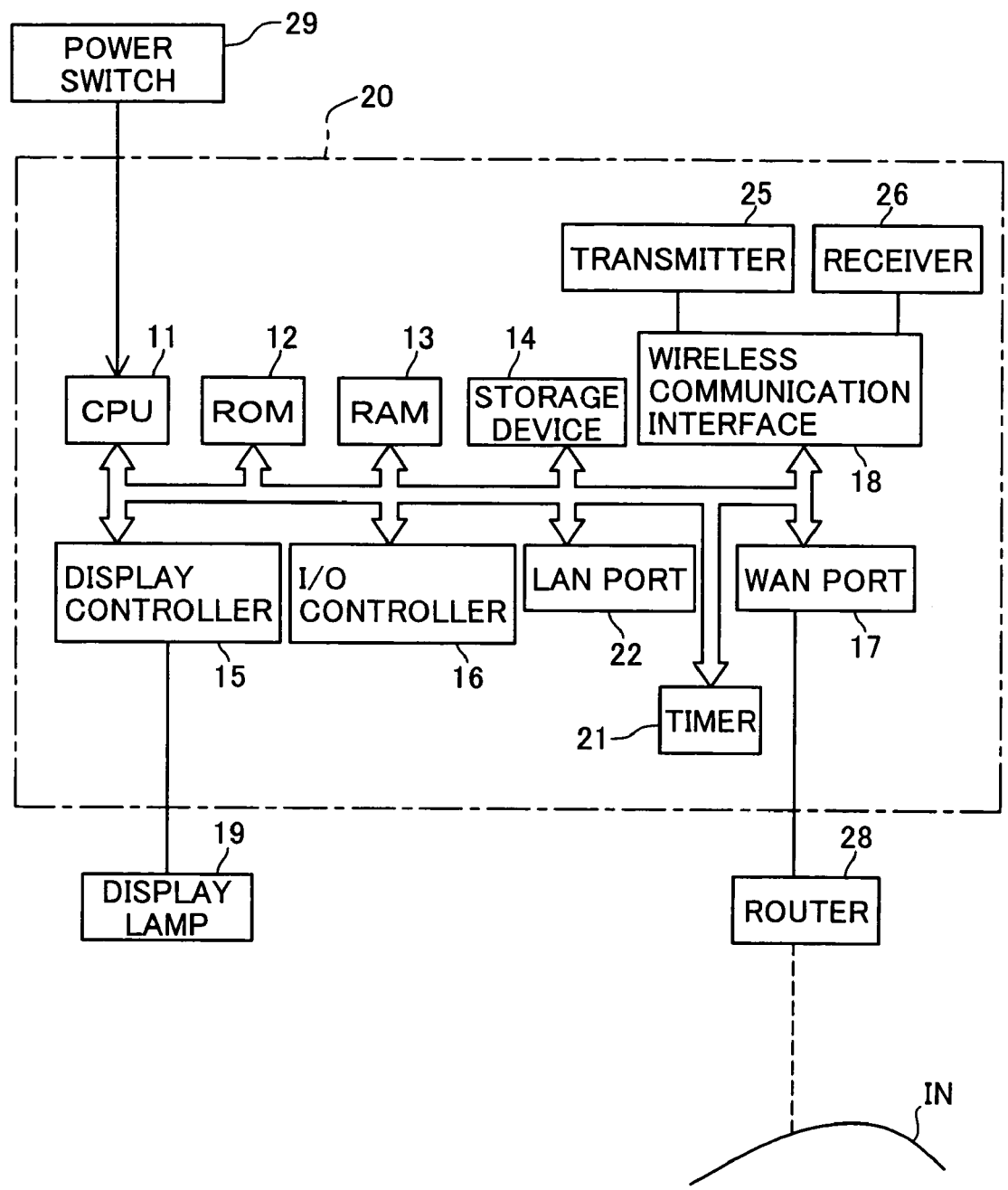
FIG. 2 is an explanatory drawing showing the construction of an access point 20.

FIG. 1 is an explanatory drawing showing the hardware construction to realize a wireless network configuration system GH1 comprising a first embodiment of the present invention, while FIG. 2 is an explanatory drawing showing the construction of an access point 20. The wireless network configuration system GH1 is a system to perform the configuration tasks needed to form a wireless LAN between the access point 20 and a terminal 50 (60), as well as the configuration tasks needed to enable the terminal 50 (60) to connect to a WAN (referred to in the preferred embodiments for realizing the invention in this Specification as the 'Internet IN'). The latter tasks are referred to below as configuration for connection to the Internet IN. This system includes an encryption key setting system LH1 that, during formation of the wireless LAN, sets a WEP key to be valid between the access point 20 and the terminal 50 (60) positioned within the wireless communication range of the access point 20 (in the first embodiment, within the wireless communication area AR1) as an encryption key without wirelessly transmitting the key data indicating the contents of the WEP key over radio waves.

As shown in FIG. 1, an access point 20 (wireless base station) comprising a wireless LAN transponder is disposed within the wireless communication area AR1. The access point 20 includes a CPU 11, a ROM 12 and a RAM 13 that are connected to the CPU 11 via a bidirectional bus, a non-volatile storage device 14 such as a hard disk, a WAN port 17 that serves as a network interface, a LAN port 22 used for connecting to a wired LAN, a wireless communication interface 18, a display controller 15, an I/O controller 16, a timer 21 and other components, as shown in FIG. 2. In addition, a power switch that switches the supply of electric power to these components ON and OFF is disposed on the outside of the housing of the access point 20.

Various programs pertaining to the formation of a wireless LAN with the terminal 50 (60) within the wireless communication area AR1 and to connection of the terminal 50 (60) in the wireless LAN to the Internet IN, as well as the data needed for execution of these programs, are stored in the ROM 12.

A display lamp 19 that displays the current communication mode of the access point 20 (either restricted receiving mode or wireless communication mode) by turning ON or OFF is connected to the display controller 15. This display lamp 19 is disposed such that it is exposed on the housing surface of the access point 20. The timer 21 measures the time required for the execution of various processes and the time that has elapsed following the execution of the various operations. The results of such timekeeping are stored temporarily in the RAM 13.

A transmitter 25 that transmits radio waves and a receiver 26 that receives radio waves are connected to the wireless communication interface 18. The transmitter 25 and receiver 26 are incorporated in the access point 20 to enable the external transmission of radio waves and the receipt of external radio waves. In FIG. 1, the range within which the radio waves transmitted from the transmitter 25 can be received and within which the receiver 26 can receive the radio waves from the terminal 50 (60) is expressed as the wireless communication area AR1. By installing such an access point 20, a wireless LAN having a communication range comprising the wireless communication area AR1 can be formed.

A router 28 that incorporates a modem is connected to the WAN port 17 via a cable. The router 28 can identify a terminal 50 (60) belonging to the wireless LAN and distinguish between multiple terminals based on the MAC address of the wireless LAN adapter 52 (62) described below. The modem in the router 28 is connected to the Internet IN via a broadband communication circuit CL such as a CATV circuit or xDSL circuit, or via a dedicated circuit supplied by the Internet service provider PV. In other words, the router functions as a gateway to connect the wireless LAN to the Internet IN.

The terminal 50 (60) is a commonly used notebook personal computer, and includes a control device comprising a CPU, a ROM, a RAM, an internal clock and the like, as well as a hard disk that functions as a storage device, a display 53 (63) that functions as a display device, a trackball, a CD drive, a memory card drive, a USB port and the like. The internal clock keeps track of the times at which various operations are executed by the CPU. The results of such timekeeping are stored temporarily in the RAM 13. Furthermore, the terminal 50 (60) may also comprise a terminal other than a notebook personal computer, such as a PDA (Personal Digital Assistant).

A wireless LAN adapter 52 (62) that functions as a wireless LAN connection device is disposed in the memory card drive of the terminal 50 (60) to enable the transmission and receipt of radio waves between such terminal and the access point. Incorporating the device driver for the wireless LAN adapter 52 (62) in the terminal 50 (60) enables the terminal 50 (60) to recognize and control the installed wireless LAN adapter 52 (62). Incidentally, a MAC address comprising an identification number unique to the adapter is assigned to the wireless LAN adapter 52 (62).

Figure 3:
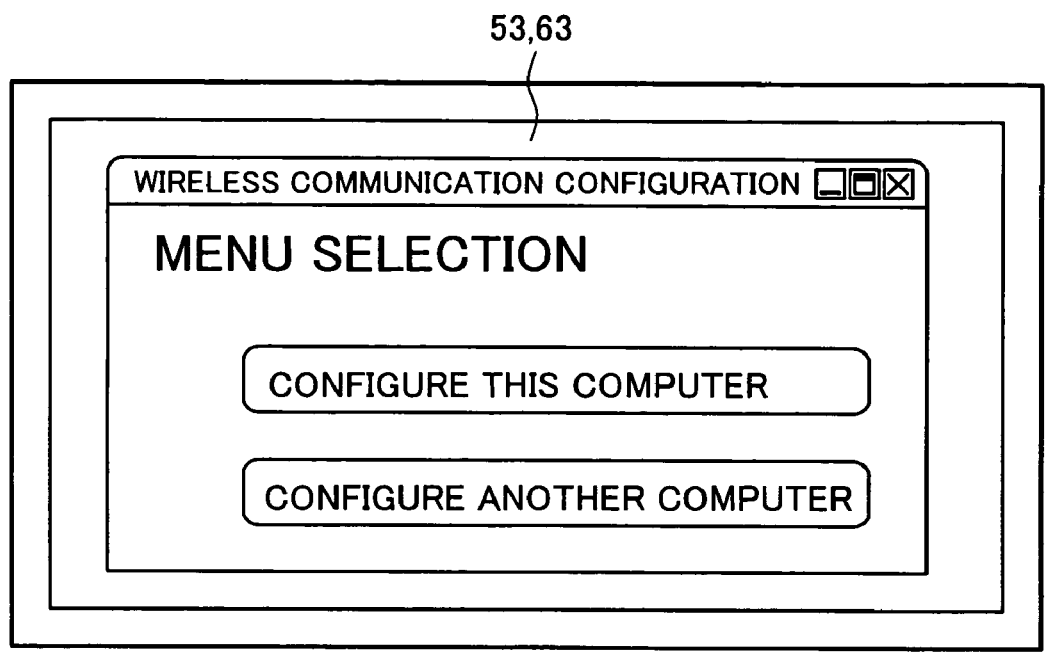
FIG. 3 is an explanatory drawing showing a menu screen displayed on a display 53 (63) after a CD-ROM 51 is inserted in a terminal 50 (60)

In the first embodiment, a setup CD-ROM 51 to be inserted in the CD-ROM drive of the terminal 50 (60) is included as an accessory part to the wireless LAN adapter 52 (62) (see FIG. 3). The CD-ROM 51 stores an installation program for the device driver for the wireless LAN adapter 52 (62), security programs pertaining to the formation of a wireless LAN and to connecting to the Internet IN via the access point, as well as data necessary for the execution of such programs. Naturally, these programs and data may be stored on a recording medium other than the CD-ROM 51. When the CD-ROM 51 is inserted in the CD-ROM drive of the terminal 50 (60), the menu screen shown in FIG. 3 is automatically displayed on the display 53 (63). Two tabs entitled 'Configure this computer' and 'Configure another computer' are displayed such that they can be selected using the trackball.

In the wireless network configuration system GH1 of the first embodiment, the MAC address of a terminal 50 (60) is registered with the access point 20, and a wireless LAN is formed between the terminal having a registered MAC address (referred to below as a 'registered terminal') and the access point 20. After a wireless LAN is formed, the terminal 50 (60) in the wireless communication area AR1 can communicate wirelessly with the access point 20 via the transmission and receipt of radio waves between the built-in wireless LAN adapter 52 (62) and the access point 20. As a result, data can be exchanged between the terminal 50 (60) and the access point 20 while the access point 20 is in an offline state (i.e., where it is not connected to the Internet). Furthermore, the access point 20 and the wireless LAN adapter 52 (62) can convert the data that they exchange into a format suitable for data communication, i.e., into so-called packets.

In the wireless network configuration system GH1 of the first embodiment, the settings governing connection to the Internet IN are configured in the terminal 50 (60) constituting a registered terminal and in the access point. When this connection configuration is completed, the terminal 50 (60) within the wireless communication area AR1 can communicate with the Internet IN via wireless communication with the access point 20. As a result, data can be exchanged between the terminal 50 (60) and the access point 20 while the access point 20 is in an online state (i.e., where it is connected to the Internet). For example, various information such as Web pages stored on a server SV connected to the Internet IN can be retrieved.

In the first embodiment, only registered terminals are authorized to connect to the wireless LAN, and a terminal whose MAC address is not registered with the access point 20 (referred to below as 'non-registered terminals') cannot connect to the wireless LAN even if it is located within the wireless communication area AR1. In other words, the wireless communication area AR1 is a 'free spot' that provides a connection to the Internet only to owners of registered terminals.

Data containing various types of content, such as a contract, service agreement or personal information, is sent and received over radio waves in an online or offline state. In the first embodiment, before a device that sends content-containing data (i.e., a registered terminal or the access point 20) transmits such data, it encodes the content-containing data using an encryption key termed a WEP key as described above, and sends the encoded content-containing data (referred to as 'encoded data' below) to the receiving device (i.e., the access point 20 or a registered terminal). The receiving device decodes the received encoded data using the WEP key and retrieves the content-containing data.

WEP is an encoding technology that is based on the private-key cryptography method used by the IEEE 802.11 standard (a method in which the same encryption key is used for encoding of data and decoding of the encoded data), and a 64-bit or 128-bit WEP key is used as the encryption key.

Where radio waves that carry content-containing data are intercepted within the wireless communication area AR1, this WEP key-based encoding makes it difficult to interpret the content-containing data, thereby preventing leakage of the transmitted content to a third party. For example, where a contract document that includes a credit card number is transmitted from a registered terminal to the access point 20, a third party can be prevented from obtaining the credit card number via interception of the transmitted radio waves.

A-2. Processing Executed in Wireless Network Configuration System GH1

Figure 4:
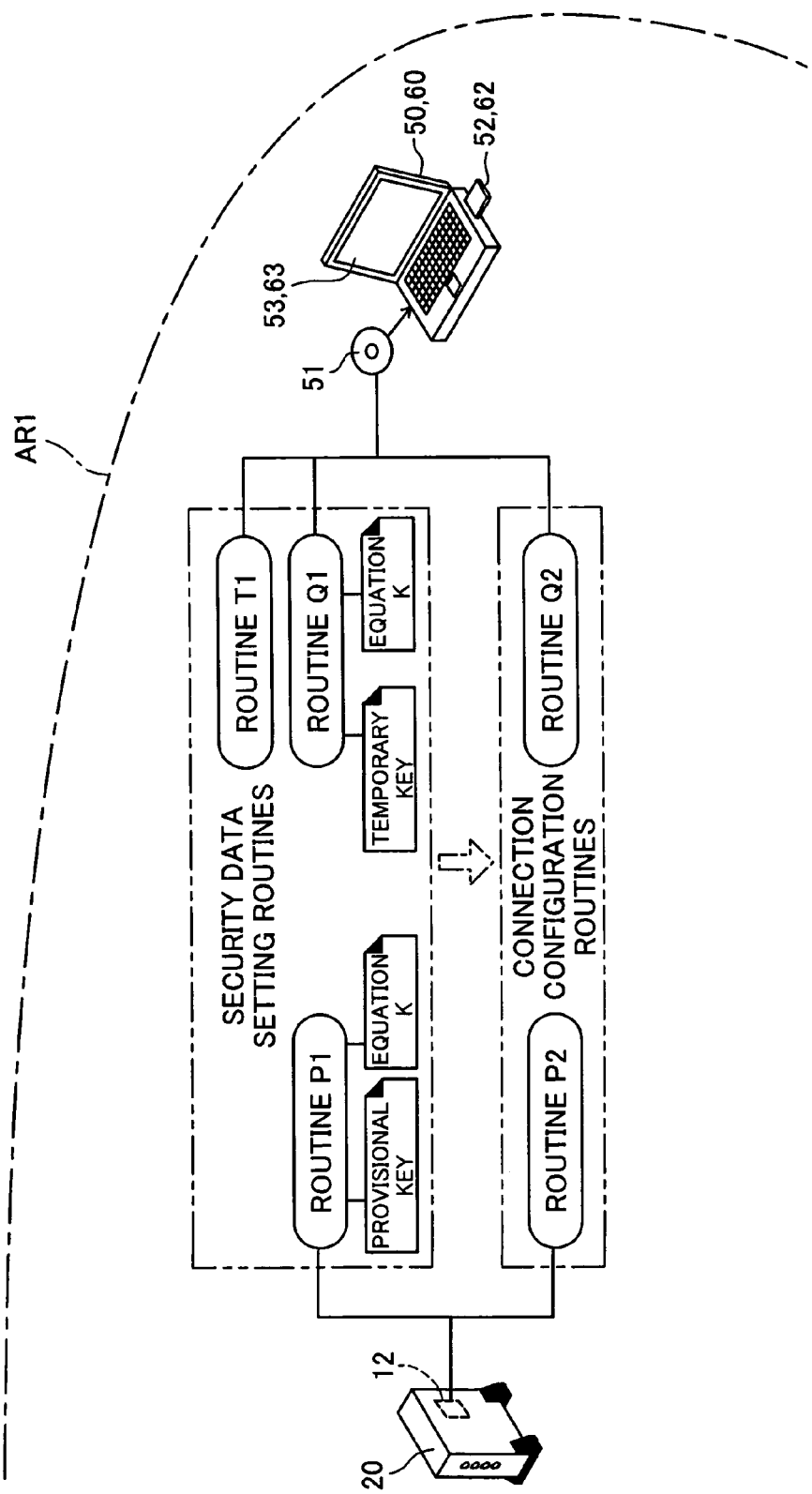
FIG. 4 is an explanatory drawing showing in a schematic fashion the contents of the programs and data stored in the ROM 12 of the access point 20 and in the CD-ROM 51 to be inserted in the terminal 50 (60)

The processing executed in the wireless network configuration system GH1 will now be described. FIG. 4 is an explanatory drawing showing the contents of the programs and data stored in the ROM 12 of the access point 20 and in the CD-ROM 51 inserted in the terminal 50 (60). As shown in FIG. 4, programs that describe the security data setting routines and the connection configuration routines, as well as data necessary to execute these programs, are stored in the ROM 12 and on the CD-ROM 51.

The security data setting routines are routines by which a wireless LAN is formed between the access point 20 and the terminal 50 (60) by registering the MAC address of the wireless LAN adapter 52 (62) in the access point 20 and setting the WEP key to be used between the access point 20 and the terminal 50 (60) in the access point 20 and the terminal 50 (60). These security data setting routines comprise a routine P1 executed by the CPU 11 of the access point 20 and routines Q1 and T1 executed by the CPU of the terminal 50 (60). The routine Q1 is a process executed by a terminal as to which a wireless LAN has not yet been formed with the access point, while the routine T1 is a process executed by a terminal as to which a wireless LAN has already been formed with the access point.

Furthermore, data indicating the temporary key and data indicating the provisional key are stored respectively in the CD-ROM 51 and the ROM 12 as data used when the security data setting routines are executed. The temporary key and the provisional key are encryption keys used in the security data setting routines until an official WEP key is set, and are preset to prescribed values. Data encoded with the temporary key can be decoded with the provisional key, and vice versa.

A computing equation by which to seek the value of the WEP key is stored on the CD-ROM 51 and in the ROM 12. In the first embodiment, the same computing equation K is stored on the CD-ROM 51 and the ROM 12.

The connection configuration routines are routines that configure the environment that enables the terminal 50 (60) to connect to the Internet IN via the access point 20 by wirelessly exchanging data encoded using the WEP key valid between the terminal 50 (60) and the access point 20 that form the wireless LAN. The connection configuration routines comprise a routine P2 executed by the CPU 11 of the access point 20 and a routine Q2 executed by the CPU of the terminal 50 (60).

A-2-1. Security Data Setting Routines

Figure 5:
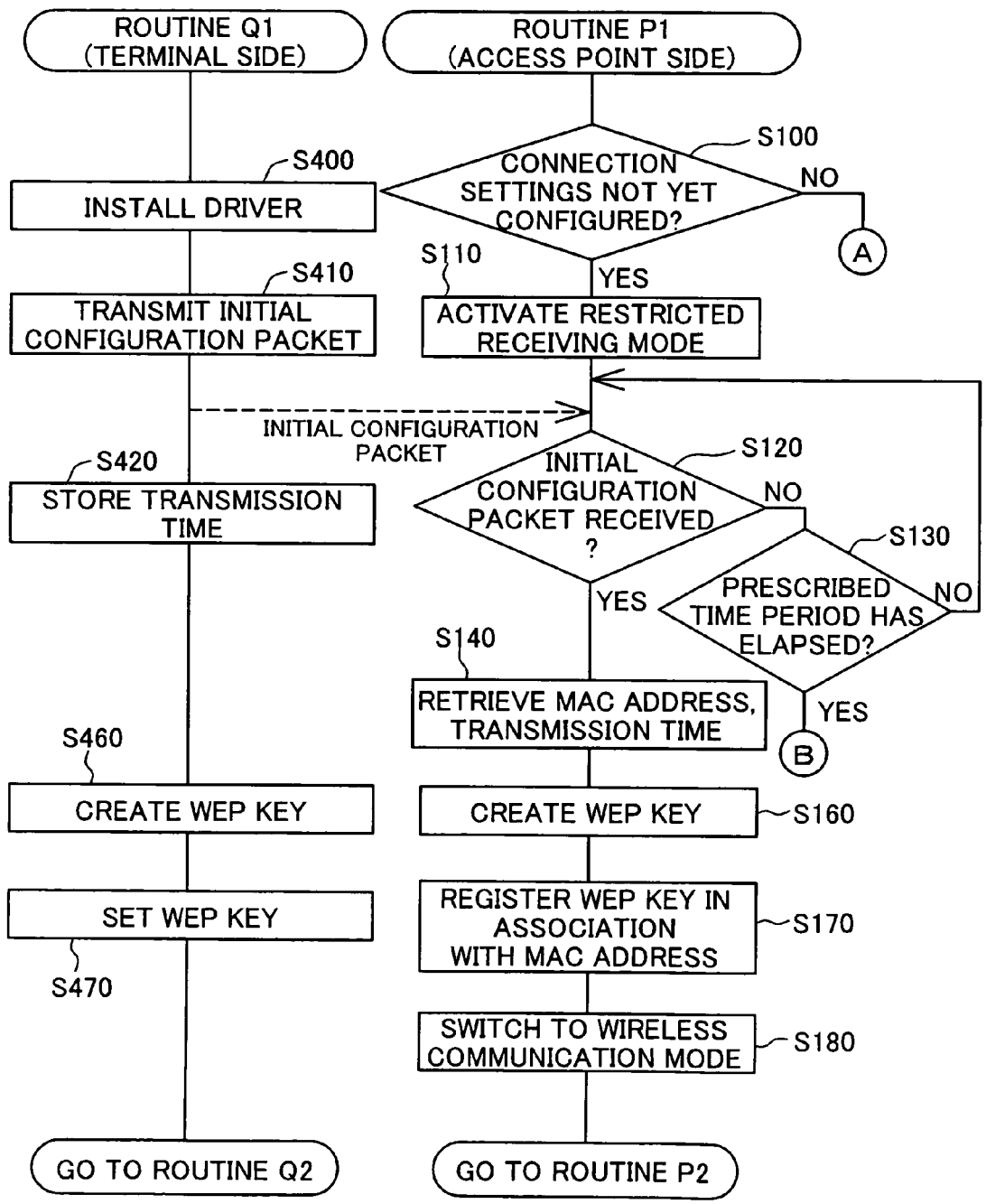
FIG. 5 is a flow chart showing the operations of security data setting routines executed where 'no wireless LAN has been formed between the access point 20 and the terminal'.

The security data setting routines will now be described with reference to FIGS. 5 and 6. FIG. 5 is a flow chart showing the operations of the security data setting routines executed where 'no wireless LAN has been formed between the access point 20 and the terminal (for example, immediately after purchase)'. In FIG. 5, the terminal whose MAC address is to be registered or for which a WEP key is to be set is assumed to be the terminal 50, and the series of operations executed on the side of the access point 20 and the series of operations executed on the side of the terminal 50 are shown as the routines P1 and Q1, respectively.

When the power switch 29 of the access point 20 is switched ON, the routine P1 executed by the CPU 11 of the access point 20 is begun. When the routine P1 is begun, the CPU 11 determines whether or not the wireless LAN connection settings have been configured (step S100). Specifically, the CPU 11 refers to the MAC address registration information in the storage device 14, and if no terminal-side MAC address is registered, the CPU 11 determines that no wireless LAN has been formed with any terminal and that wireless LAN connection settings have accordingly not been configured. On the other hand, if even one terminal-side MAC address has been registered, the CPU 11 determines that a wireless LAN has been formed with such terminal and that wireless LAN connection settings have already been configured. The processing carried out when it is determined in step S100 that wireless LAN connection settings have already been configured is described below.

Where it is determined in step S100 that wireless LAN connection settings have not yet been configured, the CPU 11 activates a restricted receiving mode (step S1i0) and flashes the display lamp 19. The restricted receiving mode is a mode in which only a packet that is transmitted from a terminal and constitutes an initial configuration packet (described below) is accepted. An initial configuration packet is a packet having a construction different from other packets officially exchanged between a terminal and the access point (hereinafter termed 'normal packets'). While the restricted receiving mode is active, the CPU 11 identifies the structure of the packet received by the receiver 26 and inputs only the initial configuration packet.

While the restricted receiving mode is active, the access point 20 in this embodiment stands by for an initial configuration packet without transmitting from the transmitter 25 beacon signals that indicate its position. As a result, the existence of the access point 20 can be concealed from a third party seeking to determine its existence with malicious intent. Naturally, a construction may be adopted in which the access point 20 emits beacon signals while the restricted receiving mode is active.

Where it is determined in step S100 that wireless LAN connection settings have already been configured, the CPU 11 of the access point 20 activates a wireless communication mode in preparation for wireless communication with the terminal for which connection settings have already been configured (step S210 in FIG. 6) and turns ON the display lamp 19. The wireless communication mode is a mode in which normal packets can be transmitted and received between a terminal and the access point. While wireless communication mode is active, the CPU 11 identifies the structure of the packets received by the receiver 26 and inputs only normal packets. The operations executed after this processing are described below with reference to FIG. 6.

The routine Q1 executed on the side of the terminal 50 will now be described. When the tab entitled 'Configure this computer' on the menu screen displayed after insertion of the CD-ROM 51 is selected via operation of the terminal 50 located within the wireless communication area AR1, the routine Q1 executed by the CPU of the terminal 50 is begun. When the routine Q1 is begun, the CPU first installs the device driver of the wireless LAN adapter 52 (step S400), determines the MAC address of the wireless LAN adapter 52 and transmits an initial configuration packet from the wireless LAN adapter 52 (step S410), and then temporarily stores in RAM data indicating the time at which the initial configuration packet was transmitted (referred to as the 'transmission time' below) (step S420). This transmission time is recorded by the internal clock described above.

The initial configuration packet includes data indicating an instruction directing that the terminal 50 be admitted to the wireless LAN (referred to as an 'admission instruction' below) as well as information specific to the terminal 50, i.e., data indicating the transmission time and data indicating the MAC address of the LAN adapter 52. The data indicating the MAC address is included in the header area of the initial configuration packet. This initial configuration packet is sent intermittently numerous times over a prescribed period of time while encoded using a temporary key. After the initial configuration packet is sent, the creation of a WEP key on the side of the terminal 50 is begun (step S460).

For a prescribed period of time following the commencement of activation of the restricted receiving mode, the access point 20 stands by for an initial configuration packet under the control and supervision of the timer 21 (steps S120, S130). If no initial configuration packet is received during this period of time, the CPU 11 determines that a wireless LAN cannot be formed with the terminal 50 due to the inability to identify the MAC address for the terminal 50, and ends the routine.

On the other hand, if an initial configuration packet sent from the terminal 50 is received by the access point 20 during this period of time in step S120 or S130 (YES in step S120), the CPU 11 decodes the received initial configuration packet using a provisional key, and retrieves the data indicating the MAC address and the data indicating the transmission time from the decoded initial configuration packet (step S140). The two received items of data are associated with each other and stored temporarily in the buffer area of the RAM 13. Creation of a WEP key on the side of the access point 20 is then begun (step S160).

The WEP key creation operations performed in steps S160 and S460 are carried out by the CPU 11 of the access point 20 and the CPU of the terminal 50, respectively, each assigning the transmission time value for use in the computing equation K. Because calculation is carried out in both the access point 20 and the terminal 50 using a common transmission time value entered in the identical computing equation K, the values resulting from this assignment and calculation are naturally identical. The value resulting from this assignment and calculation becomes the value of the official WEP key valid between the terminal 50 and the access point 20. This computing equation K may comprise a multidimensional function that includes as an element of the equation the number comprising the value of the transmission time.

Figure 7:
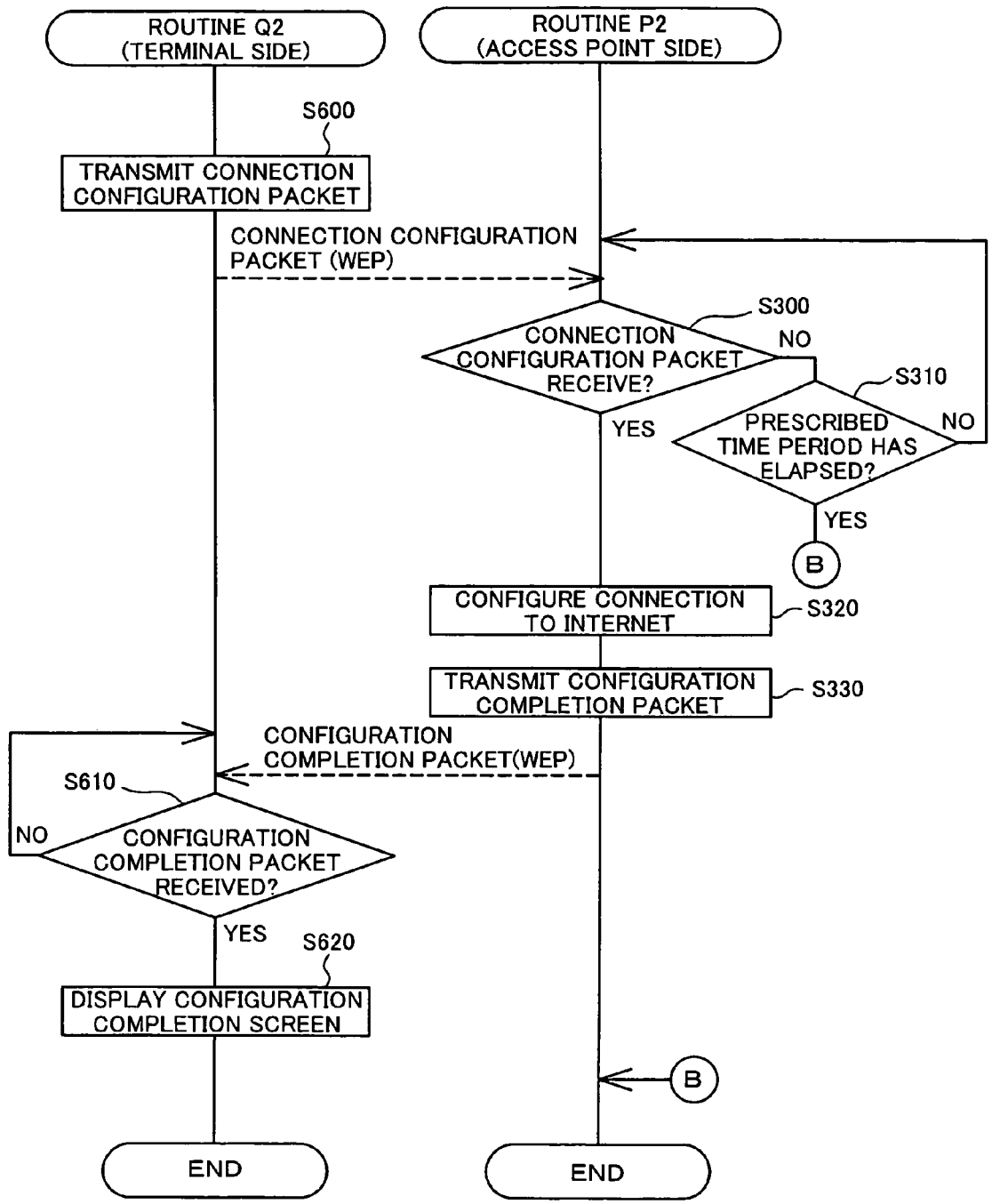
FIG. 7 is a flow chart showing the operations of connection configuration routines.

After a WEP key is created in this fashion, the CPU of the terminal 50 sets the WEP key by storing the value thereof in the LAN information area of the hard disk (step S470), ends the routine Q1, and advances to the subsequent routine Q2 (shown in FIG. 7). At the same time, the CPU 11 of the access point 20 registers the WEP key by storing the value thereof in the management area of the storage device 14 in association with the MAC address of the terminal 50 (step S170). With this, registration of the MAC address of the terminal 50 and setting of the WEP key used for wireless communications between the access point 20 and the terminal 50 in the access point 20 are completed. After the WEP key is registered, the CPU 11 of the access point 20 switches the active mode from the restricted receiving mode to the wireless communication mode (step S180), ends the routine P1, and advances to the subsequent routine P2 (shown in FIG. 7). A wireless LAN that connects the terminal 50 and the access point 20 is thereby formed. Thereafter, encoded data encoded using the set or registered WEP key can be exchanged between the terminal 50 and the access point 20.

Figure 6:
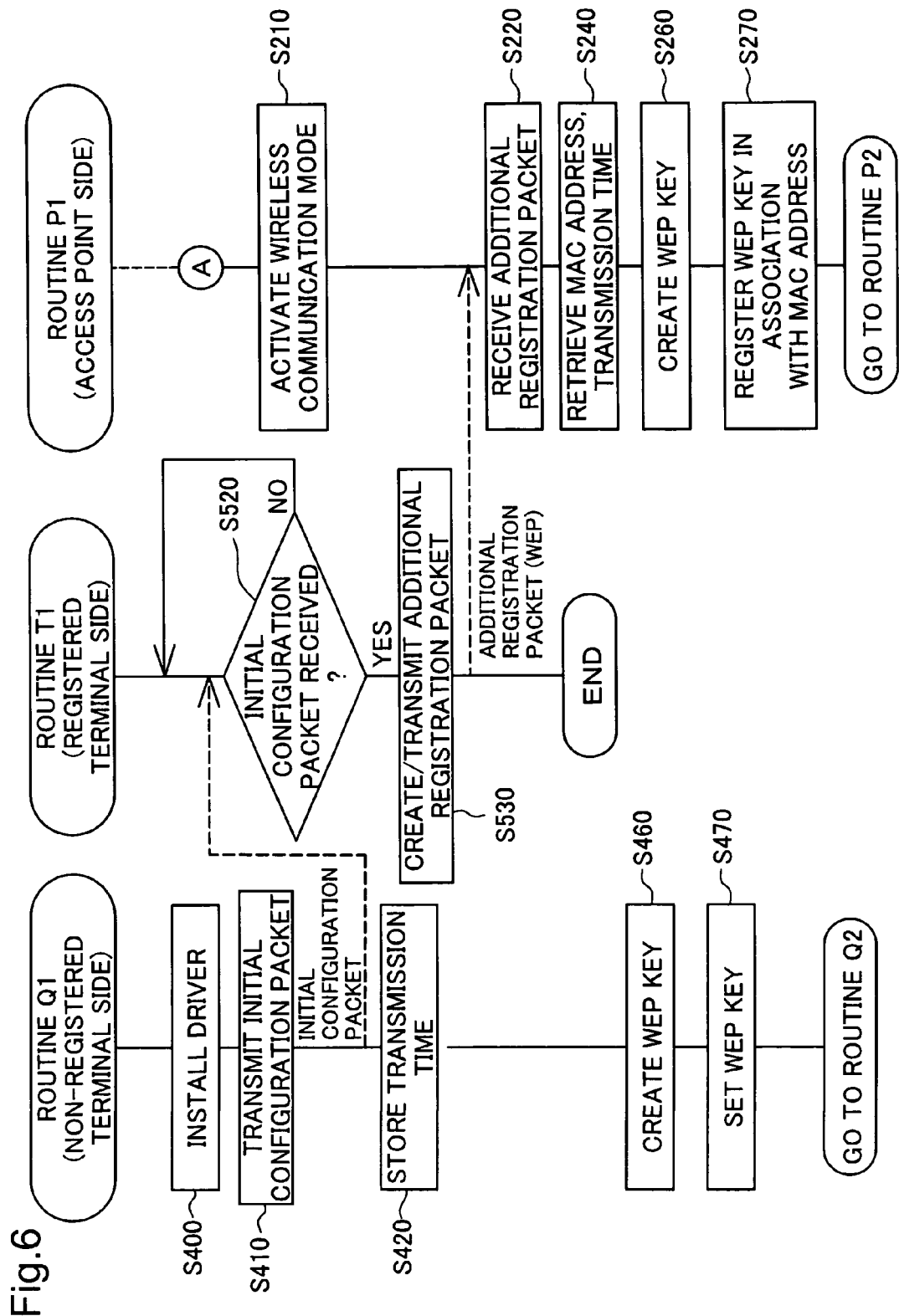
FIG. 6 is a flow chart showing the operations of security data setting routines where 'a wireless LAN has already been formed between the access point 20 and the terminal'.

FIG. 6 is a flow chart showing the operations of the security data setting routines executed when 'a LAN has already been formed between the access point 20 and a terminal' (such as after the terminal 50 MAC address and a WEP key have been registered via execution of the routine P1). In FIG. 6, the terminal that already has a wireless LAN formed with the access point 20 via registration of the MAC address and of a WEP key is deemed the terminal 50, and where a terminal that also seeks to form a LAN in addition to the terminal 50 is deemed a terminal 60, the series of operations P1 executed by the access point 20, the series of operations Q1 executed by the terminal 60 and the series of operations T1 executed by the terminal 50 are shown as the routines P1, Q1 and T1, respectively.

After the CD-ROM 51 is inserted, when the 'Configure another computer' tab is selected from the displayed menu screen via operation of the terminal 50 within the wireless communication area AR1, the routine T1 executed by the CPU of the terminal 50 is begun.

When the tab entitled 'Configure this computer' is then selected from the menu screen displayed following the insertion of the CD-ROM 51 via operation of the terminal 60 positioned within the wireless communication area AR1, the routine Q1 executed by the CPU of the terminal 60 is begun. When the routine Q1 is begun, the CPU of the terminal 60 executes the same operations executed by the CPU of the terminal 50 in FIG. 5 (steps S400-S470). Therefore, after the device driver for the wireless LAN adapter 62 is installed, an initial configuration packet is sent from the wireless LAN adapter 62 (step S410) and data indicating the transmission time of the initial configuration packet is stored temporarily in RAM of the terminal 60 (step S420).

At the same time, the routine P1 has already been started in the access point 20 via the switching ON of the power switch 29 as described above. In this situation, because it is determined in step S100 of FIG. 5 that wireless LAN configuration (i.e., registration of the MAC address and of a WEP key) for the terminal 50 has already been carried out, the wireless communication mode is active on the side of the access point 20 (NO in step S100 in FIG. 5, step S210 in FIG. 6).

When the restricted receiving mode is inactive as described above, the access point 20 does not accept the initial configuration packet sent from the terminal 60. Therefore, the CPU of the terminal 50 for which a wireless LAN connection to the access point 20 has already been established executes the routine Ti and receives via the LAN adapter 52, rather than via the access point 20, the initial configuration packet sent from the terminal 60 (step S520).

The CPU of the terminal 50 then converts the received initial configuration packet into the normal packet format that is accepted by the access point 20 in wireless communication mode and sends to the access point 20 the additional registration packet created via this conversion (step S530), whereupon it ends the routine Ti. The additional registration packet includes data included in the initial configuration packet sent from the terminal 60 (data indicating the admission instruction for the terminal 60, data indicating the transmission time of the initial configuration packet from the terminal 60, and data indicating the MAC address of the wireless LAN adapter 62). This additional registration packet is sent while encoded using the WEP key valid between the access point 20 and the terminal 50 that was set in step S470 in FIG. 5.

When the additional registration packet sent from the terminal 50 in this fashion is received by the access point 20 (step S220), the CPU 11 of the access point 20 decodes the received additional registration packet using the WEP key valid between the terminal 50 and the access point 20 and registered in step S170 of FIG. 5, and retrieves from the decoded additional registration packet the data indicating the MAC address of the terminal 60 and the data indicating the transmission time of the initial configuration packet from the terminal 60 (step S240). These two items of retrieved data are stored temporarily in the buffer area of the RAM 13 in association with each other.

The CPU 11 of the access point 20 and the CPU of the terminal 60 then create a WEP key using a computing equation K1 and set or register this WEP key in the same manner as that described above with reference to FIG. 5 (steps S260-270, S460-S470), ends the routines P1 and Q1, and advances to the subsequent routines P2 and Q2 (shown in FIG. 7). With this, registration of the MAC address of the terminal 60 in the access point 20 and setting of a WEP key used for wireless communications between the access point 20 and the terminal 60 are completed. Thereafter, encoded data encoded using the set or registered WEP key is exchanged between the terminal 60 and the access point 20.

The value for the transmission time of the initial configuration packet sent from the terminal 60 that was assigned for use in the computing equation K1 during steps S260 and S460 in FIG. 6 differs from the value for the transmission time of the initial configuration packet sent from the terminal 50 that was previously assigned for use in the computing equation K1 during steps S160 and S460 in FIG. 5. As a result, the value for the WEP key valid between the terminal 60 and the access point 20 and registered or set in steps S270 and S470 in FIG. 6 differs from the value of the WEP key valid between the terminal 50 and the access point 20 and registered or set in steps S170 and S470 in FIG. 5.

A-2-2. Connection Configuration Routines

The operations of the security data setting routines were described above. The operations of the connection configuration routines executed after the completion of the security data setting routines will now be described with reference to FIG. 7. FIG. 7 is a flow chart showing the operations of the connection configuration routines. In FIG. 7, the series of operations P2 executed on the side of the access point 20 and the series of operations Q2 executed on the side of the terminal 50 (60) are described as routines P2 and Q2, respectively.

When a WEP key is set in the terminal 50 (60) in step S470, the CPU of the terminal 50 (60) encodes a connection configuration packet using the set WEP key and sends it to the access point 20 (step S600). The connection configuration packet includes as header information data indicating the MAC address of the wireless LAN adapter 52 (62), as well as includes data needed for configuring the connection to the Internet IN (referred to below as 'WAN connection configuration data'). This WAN connection configuration data may include data specifying the type of communication circuit CL by which the access point 20 is to connect to the Internet IN (such as xDSL, CATV or optical fiber, for example), data indicating the contents of the contract with the ISP (such as the IP address assigned by the ISP and the user name and password used for authentication, for example), and data pertaining to the characteristics of the terminal 50 (60) (such as the type and version of OS, the drive construction and Web browser settings). These items of data may be written to the ROM or hard disk of the terminal 50 (60) in advance or may be written to a recording medium that can be read by the CD drive, memory card drive or USB port of the terminal 50 (60) (such as a CD-ROM, CD-RW, memory card, USB memory or the like).

After the WEP key is registered in steps S170 and S270, the access point 20 in which the wireless communication mode is activated stands by for a prescribed period of time following WEP key registration (steps S300, S310) and waits for a connection configuration packet. If no connection configuration packet is received during this period, the CPU 11 determines that configuration to connect the terminal 50 (60) to the Internet IN cannot be carried out because the data needed to perform configuration for such connection was not obtained, and thereupon ends the routine.

At the same time, if a connection configuration packet sent from the terminal 50 (60) is received by the access point 20 in step S300 during the time period described above (YES in step S300), the CPU 11 decodes the received connection configuration packet using the registered WEP key, retrieves from the decoded connection configuration packet the data indicating the MAC address and the data needed for connection to the Internet IN, and performs connection configuration to enable the terminal 50 (60) housing the wireless LAN adapter 52 (62) having the MAC address to connect to the Internet IN (step S320). Through this configuration for connection to the Internet IN, data specifying the circuit by which to connect to the Internet IN, data indicating the contents of the contract with the ISP, and data pertaining to the characteristics of the terminal 50 (60) are stored in the management area of the storage device 14 in association with the MAC address of the terminal 50 (60).

After configuration for connection to the Internet IN is completed, the CPU 11 of the access point 20 creates a configuration completion packet by adding the MAC address data as header information to data indicating that connection configuration has been completed, encodes this configuration completion packet using the registered encryption key and sends it to the terminal 50 (60) (step S330), whereupon the routine P2 ends. When the configuration completion packet is received by the terminal 50 (60) (step S610), the CPU of the terminal 50 (60) displays a configuration completion screen on the display 53 (63) (step S620), whereupon the routine Q2 ends. As a result, the owner of the terminal 50 (60) can connect his own terminal 50 (60) to a communication circuit CL or a dedicated ISP circuit PV via the access point 20 within the wireless communication area AR1 and thereby connect to the Internet IN. The content-containing data exchanged between the terminal 50 (60) and the server SV after the connection is established is exchanged between the wirelessly-connected terminal 50 (60) and access point 20 while encoded using the WEP key (i.e., as encoded data).

A-3. Operation and effects

Using the wireless network configuration system GH1 that includes the encryption key setting system LH1 of the first embodiment described above, by performing the security data setting routines (FIG. 5), a WEP key to be used between the terminal 50 and access point 20 is set in the terminal 50 and access point 20, thereby forming a wireless LAN therebetween. Therefore, the owner of the terminal 50 can set the WEP key to be used between the terminal 50 and the access point 20 in the terminal 50 and the access point 20 simply by instructing from the terminal 50 that an initial configuration packet be sent to the access point 20 while restricted receiving mode is active in the access point 20. Furthermore, because this WEP key setting is performed internally by the terminal 50 and the access point 20, the terminal 50 and the access point 20 need not have a wireless exchange of data indicating the contents of the WEP key to be used therebetween (referred to below as 'key data') in order to set the WEP key, so there is no risk that the WEP key data will be obtained by a third party via interception of the wireless radio waves. Therefore, a WEP key required for creation of a wireless LAN may be set easily while preventing the leakage of data pertaining to such encryption key.

In the first embodiment, the access point 20 in which the restricted receiving mode is active stands by for an initial configuration packet without transmitting beacon signals used for locating the position thereof. Accordingly, because it is difficult to determine the position of the access point 20, security data (such as the computation equation K, transmission time data, data regarding the created WEP key, data regarding the temporary key or the provisional key, or data indicating the MAC address, for example) can be prevented from being acquired from the access point 20 by an unauthorized party.

The access point 20 of the first embodiment displays the display lamp 19 while the restricted receiving mode is active in a different fashion from when the wireless communication mode is active. Therefore, the owner of the terminal 50 can easily determine that the access point 20 is in a state in which a wireless LAN can be formed.

Using the wireless network configuration system GH1 of the first embodiment, even where another terminal 60 is sought to be added to use a wireless LAN after a wireless LAN is formed between the terminal 50 and the access point 20, a WEP key to be used between the terminal 60 and the access point 20 is set in the terminal 60 and access point 20 and a wireless LAN formed therebetween by executing the security data setting routines (see FIG. 6). Therefore, the owner of the terminal 60 can set a WEP key to be used between the terminal 60 and the access point 20 in the terminal 60 and the access point 20 simply by instructing from the terminal 60 that an initial configuration packet be sent to the access point 20. Furthermore, because the WEP key is set internally by the terminal 60 and the access point 20, the terminal 60 and the access point 20 need not have a wireless exchange of key data in order to set the WEP key to be used therebetween, so there is no risk that the WEP key data will be obtained by a third party via interception of the wireless radio waves. Therefore, even where a terminal that will use a wireless LAN is newly added, an encryption key required for creation of a wireless LAN may be set easily while preventing the leakage of data pertaining to such encryption key.

In the wireless network configuration system GH1 of the first embodiment, the initial configuration packet sent from the terminal 50 (60) is sent wirelessly to the access point 20 while encoded using a temporary key. Consequently, even if the radio waves carrying the initial configuration packet are intercepted, it is difficult for information specific to the terminal 50 (60), such as the MAC address, to be obtained by analyzing the initial configuration packet. Therefore, an outside party's unauthorized access to the network using information specific to the terminal 50 (60) can be prevented.

In the wireless network configuration system GH1 of the first embodiment, the value of the WEP key set in the terminal 50 (60) and the access point 20 is determined in association with the time at which the initial configuration packet was sent from the terminal 50 (60). As a result, it is extremely difficult to interpret the WEP key set in the terminal 50 (60) and the access point 20, and the security level of the wireless communications therebetween can be further increased.

In the wireless network configuration system GH1 of the first embodiment, configuration to enable the terminal 50 (60) to connect to the Internet IN via the access point 20 is carried out automatically by executing the connection configuration routines after the above security data setting routines are completed. When the connection configuration routines are executed, the connection configuration packet including the data needed to perform configuration for connection to the Internet IN is sent wirelessly from the terminal 50 (60) to the access point 20 while encoded using the previously set WEP key valid between the terminal 50 (60) and the access point 20. Consequently, it is difficult to interpret the connection configuration packet obtained via interception of the wireless radio waves. Therefore, the configuration tasks required to establish a connection to the Internet IN when a wireless LAN is formed can be executed easily with a high level of security.

In the first embodiment, the WEP key creation operations are begun on the side of the terminal 50 after the initial configuration packet is sent from the terminal 50 (step S410) and on the side of the access point 20 after the MAC address is retrieved (step S140), but it is acceptable if after the initial configuration packet is sent, the CPU of the terminal 50 begins WEP creation when it is confirmed that the initial configuration packet was received by the access point 20. This determination as to whether or not the initial configuration packet was received may be carried out using the data return function of the wireless LAN adapter 52.

In the above embodiment, the value of the terminal MAC address and the value of the transmission time are included in the initial configuration packet as terminal-specific information, and the WEP key to be used between the terminal and the access point is set by having the terminal and access point each carry out calculation of the computing equation K using the value of the transmission time as an assigned value for that variable. The computing equation K may be changed to a computing equation that uses the MAC address as an assigned variable value, or to a computing equation that uses both the transmission time and the MAC address as assigned variable values. It may also be changed to a computing equation that uses some value other than the MAC address or transmission time (such as the terminal CPU ID, a random number generated by the terminal or the like) as the assigned value. In this case, a construction may be adopted in which data such as the terminal CPU ID or a random number generated by the terminal is included in the initial configuration packet sent by the terminal in step S410 in FIGS. 5 or 6, and the access point that receives the initial configuration packet retrieves the terminal CPU ID or terminal-generated random number in step S140 in FIG. 5 or step S240 in FIG. 6.

A construction may also be adopted in which the routine P1 is ended immediately if the access point 20 receives radio waves indicating that unauthorized access is taking place during the operation of step S120 in FIG. 5. It is also acceptable if, where the terminal 50 receives radio waves indicating that unauthorized access is taking place, the data instructing that the routine P1 be ended is sent from the terminal 50 to the access point 20 while encoded using the previously set WEP key and the access point 20 receiving this data immediately ends the routine P1.

In the above first embodiment, a construction may be adopted in which the access point 20 includes an operation member to instruct the execution of the security data setting routine (the routine P1) or the connection configuration routine (the routine P2), such as a button or switch to start the routine P1, or in which the terminal 50 (60) includes an operation member to instruct the execution of the security data setting routines (the routines Q1, T1, Q2), such as a button or switch to start the routine Q1 or T1. Such a construction may be realized by connecting physical operation buttons or selection tabs that can be selected on the screen via operation of the trackball to the input interface of the control mechanism of the access point 20 or the terminal 50 (60). In this case, in the event an error occurs during any of the various routines, the routine can be restarted using an operation member, further increasing user convenience.

Where the access point 20 includes one or more operation members as described above, a construction may be adopted in which the effective range of the radio waves transmitted by the access point 20 can be made smaller than the wireless communication area AR1 by operating such operation member. Such a construction may be realized by storing in the ROM 12 in advance an operation program that is executed by the CPU 11 following the receipt of an operation signal from the operation member in order to set the standard configuration value for the output from the transmitter 25 to be 1/n (where n is a preset constant). In addition, where the terminal 50 (60) includes an operation member as described above, a construction may be adopted in which the effective range of the radio waves transmitted by the LAN adapter 52 (62) of the terminal 50 (60) is reduced by operating such operation member. If this type of construction is adopted, because the effective transmission range for packets transmitted wirelessly by the access point 20 (i.e., configuration completion packets) and packets transmitted wirelessly by the terminal 50 (60) (i.e., initial configuration packet and connection configuration packets) is reduced, the risk of interception of the radio waves over which these packets travel is also reduced. Therefore, the leakage of data indicating the MAC address included in each packet can be prevented, and a highly secure wireless LAN can be realized. Where the access point 20 is located in a free spot in particular, the leakage to a third party of the MAC addresses of large numbers of persons seeking to use the free spot can be reliably prevented during formation of a wireless LAN.

B. Second Embodiment

Figure 8:
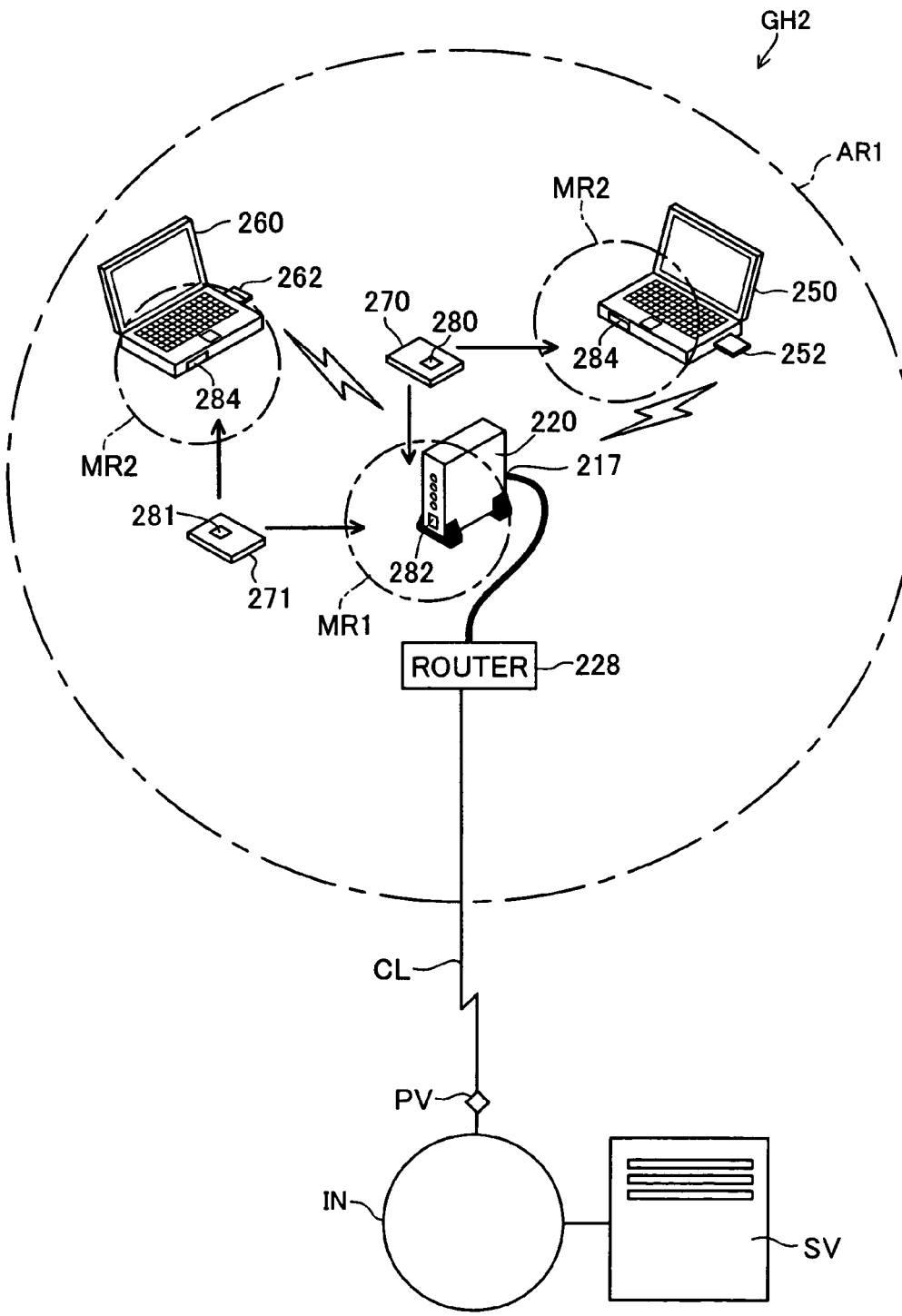
FIG. 8 is an explanatory drawing showing the hardware construction to realize a wireless network configuration system GH2 comprising a second embodiment of the present invention.

A second embodiment will be described below with reference to FIG. 8. The wireless network configuration system GH2 shown in FIG. 8 includes virtually all of the components of the wireless network configuration system GH1 of the first embodiment shown in FIG. 1. In FIG. 8, each of the components common to the two embodiments is indicated using the same numbers in the tens and ones places and/or the same letters used in FIG. 1, and will not be further described in this Specification.

The wireless network configuration system GH2 of the second embodiment differs from the wireless network configuration system GH1 of the first embodiment in that configuration to form a wireless LAN between the access point 20 and the terminal 50 (60) and configuration for connection to the Internet IN are realized using RFID (Radio Frequency Identification), a specification governing wireless identification of individual devices or units and data transmission and receipt. RFID uses an RFID tag comprising a chip having a built-in IC and antenna and a reader/writer that transmits radio waves to the RFID tag and reads and writes information stored in the IC of the RFID tag. This system GH2 includes an encryption key setting system LH2 that, when a wireless LAN is to be formed, sets a common WEP key in the terminal 50 (60) and the access point 20 via wireless radio wave transmission of key data indicating the contents of the WEP key used as an encryption key within a small range that can be reached by the radio waves transmitted by the reader/writer (in the second embodiment, the secure communication area MR1 (MR2)). Because RFID transmits using electromagnetic induction, the effective range is normally only several centimeters.

As shown in FIG. 8, the wireless network configuration system GH2 includes an RFID card 270 (271) having an RFID tag 280 (281), an access point 220 having a reader/writer 282, and a terminal 250 (260) having a reader/writer 284. The RFID tag 280 (281) is a so-called passive tag that generates electric power using the induced electromotive force arising from the receipt of radio waves from the reader/writer 282 (284), and uses this electric power to activate the incorporated IC.

Configuration information QJ comprising information needed to form a wireless LAN between the terminal 250 and the access point 220 and information needed to configure the connection to the Internet IN (such as data indicating the MAC address of the terminal 250, data regarding the WEP key that serves as an encryption key used when wireless communication takes place between the terminal 250 and the access point 220, and WAN connection configuration data) is stored in advance in the IC of the RFID tag 280, and similarly, configuration information QJ pertaining to the terminal 260 is stored in advance in the IC of the RFID 281. The effective range of the radio waves transmitted by the reader/writer 282 (i.e., the secure communication area MR1) and the effective range of the radio waves transmitted by the reader/writer 284 (i.e., the secure communication area MR2) are set to be smaller than the effective range of the radio waves transmitted by the access point 20 of the first embodiment (i.e., the wireless communication area AR1).

In the wireless network configuration system GH2 having the construction described above, where the RFID card 270 (271) is placed within the secure communication area MR2 as shown by the arrows in FIG. 8, the configuration information QJ stored in the IC of the RFID tag 280 (281) of the RFID card 270 (271) is read by the reader/writer 284 of the terminal 250 (260). Where the RFID card 270 (271) is placed within the secure communication area MR1 as shown by the arrows in FIG. 8, the configuration information QJ stored in the IC of the RFID tag 280 (281) of the RFID card 270 (271) is read by the reader/writer 282 of the access point 220. The access point 220 and terminal 250 (260) respectively carry out MAC address registration, WEP key setting and configuration for connection to the Internet IN based on the read configuration information QJ. As a result, the owner of the terminal 250 (260) for which wireless LAN formation is sought can carry out the configuration tasks needed to form a wireless LAN and connect to the Internet IN by simply bringing the RFID card 270 (271) close to the access point 220 and the terminal 250 (260). When this is done, because the effective range of the radio waves emitted by the reader/writer 282 (284) is limited to the secure communication range MR1 (MR2), which is smaller than the wireless communication area AR1, there is a smaller risk that the radio waves that carry the configuration information QJ such as the WEP key data will be intercepted by an outside party. Therefore, the leakage of the configuration information QJ that includes the WEP key data can be made more unlikely to occur, and a wireless LAN with a high level of security can be realized. Where the access point 220 is located in a free spot in particular, the leakage of WEP key data to a third party during WEP key setting, for example, can be prevented for a large number of persons seeking to use the free spot. Therefore, the confidentiality of communications can be preserved for a large number of users.

In the second embodiment, a construction may be adopted in which the reading of the RFID tag 280 (281) by the access point 220 is omitted. Specifically, a large number of RFID cards 270, 271, . . . that incorporate RFID tags 280, 281, . . . that contain configuration information QJ that differs for each person's terminal are made available in advance. Here, an example is described in which different WEP key data is recorded in the above RFID tags 280, 281, . . . as the configuration information QJ (i.e., in which the RFID cards 270, 271, . . . hold data for different WEP key values). In this case, all data pertaining to the WEP key data held by the RFID cards 270, 271, . . . is recorded in the ROM 212 of the access point 220.

The WEP key setting method for this construction will now be described. First, the administrator of the free spot distributes the RFID cards 270, 271, . . . individually to the users who wish to use a wireless LAN. The user brings his distributed RFID card close to his terminal 250 (260, . . . ). In this way, the WEP key data recorded in the RFID tag of the RFID card is read by the reader/writer 284 of the terminal 250 (260, . . . ).

The CPU of the terminal 250 (260, . . . ) receives the WEP key data read by the reader/writer 284 and sets the value specified by this data as the WEP key to be used for communications with the access point 220. The CPU of the terminal 250 (260, . . . ) then creates a WEP key packet in which the MAC address of the wireless LAN adapter 252 (262, . . . ) is added as header information to the WEP key data read by the reader/writer 284, and this WEP key packet is sent wirelessly to the access point 200 from the wireless LAN adapter 252 (262, . . . ) after being encoded using the previously-set WEP key.

The access point 220 that receives the WEP key packet from the terminal 250 then extracts one item of data from all WEP key data stored in the ROM 212 and attempts to decode the WEP key packet using the value specified by the extracted WEP key data. If decoding fails, a different item of data is extracted from all WEP key data stored in the ROM 212, and WEP key packet decoding is attempted as before. These decoding attempts are continuously repeated until decoding is successful. When decoding is successful, the access point 220 identifies the value of the MAC address of the terminal 250 from the header information of the decoded WEP key packet, and registers the value of the successfully decoded WEP key, in association with the value of the corresponding MAC address, as the WEP key to be used for communications with the terminal 250. WEP keys for the other terminals 260, . . . are registered via the identical processing as described above for the terminal 250.

As a result, a common WEP key can be set for the terminal 250 (260, . . . ) and the access point 220 without bringing the RFID card 270 (271, . . . ) close to the access point 220, thereby permitting more freedom in regard to the location at which the access point 220 is installed. For example, a WEP key can be set easily even where the access point 220 is installed at a location that cannot be reached by the user.

In the second embodiment described above, the RFID cards 270, 271, . . . can be used only once, ensuring that the WEP key data assigned to each user is unique. Naturally, it is acceptable if the WEP key data recorded in the RFID tags 280, 281, . . . of used RFID cards 270, 271, . . . is rewritten with data indicating a value that has not yet been used by anyone, which would enable the used RFID cards 270, 271, . . . to be reused.

In addition, in the second embodiment described above, an RFID card 270 (271) was used as the medium on which to record the configuration information QJ, but the configuration tasks required for wireless LAN formation and for connection to the Internet IN can also be carried out easily and automatically without using this RFID card 270 (271). For example, a construction may be envisioned in which an RFID tag in which the configuration information QJ is stored in advance is incorporated in the wireless LAN adapter 252 (262) in a form that may be read by the terminal 250 (260). If such a construction is used, when the terminal 250 (260) in which the LAN adapter 252 (262) is installed is placed within the secure communication area MR1, the configuration information QJ stored in the RFID tag of the wireless LAN adapter 252 (262) is read by the reader/writer 282 of the access point 220 and the CPU of the terminal 250 (260). Based on the configuration information QJ read in this fashion, the access point 220 and the terminal 250 (260) each carry out MAC address registration, WEP key setting and configuration for connection to the Internet IN. Therefore, the owner of a terminal 250 (260) who wishes to form a wireless LAN can carry out the configuration tasks needed to form a wireless LAN and connect to the Internet IN via the exceedingly simple method of bringing his terminal 250 (260) in which the wireless LAN adapter 252 (262) is installed close to the access point 220. Furthermore, where a wireless LAN is to be formed for a large number of terminal owners, it is not necessary to make a large number of RFID cards 270, 271 . . . available or to include a reader/writer in the each of the terminals 250, 260, which makes the system construction simpler.

While the above RFID-based construction used passive-type RFIDs, active-type tags that incorporate a power source and transmit radio waves to a reader/writer using the power from this power source may be used instead.

C. Modifications

While embodiments of the present invention were described above, the present invention is not limited to these embodiments in any way whatsoever, and may naturally be implemented in various forms within the essential scope thereof.

For example, while in the above embodiments, the information needed for forming a wireless LAN between the terminal and the access point and the information needed for configuring the terminal's connection to the Internet IN (i.e., the configuration information QJ) was stored in recording media such as the ROM 12 of the access point 20, the CD-ROM 51, the ROM or hard disk of the terminal 50 (60), or an RFID tag, it is not essential that these recording media contain all information included in the configuration information QJ. For example, in the first embodiment, it is acceptable if only the data regarding the computing equation K used to seek the value of the WEP key is stored, and in the second embodiment, it is acceptable if only the common WEP key data set in the terminal 250 (260) and the access point 220 is stored.

In the above embodiments, it is acceptable if an external antenna is connected to the access point 20 via hard-wiring, such that MAC address registration and WEP key setting are carried out via wireless communication between the external antenna and the terminal 50. This increases the degree of freedom in regard to the location at which the access point 20 can be installed. For example, by placing an external antenna in a corner of a store and using the area surrounding the external antenna as the WEP key setting area while installing the access point 20 in the center of the store, the size of the wireless communication area can be maximized within the store.

While the above embodiments envisioned the case in which the access point 20 was placed in a free spot, the access point 20 may naturally be placed in a location other than a free spot (such as in a home or office).

In the above embodiments, WEP was used as the technology by which to encode the contents of the data exchanged between the terminals and the access point, but an encoding technology other than WEP may be used. For example, a public-key encryption method (a method in which different encryption keys are used for encoding the data and decoding the encoded data) may be used. In addition, WPA (Wi-Fi Protected Access), a stronger type of encoding technology than WEP, may be used.

It should be clearly understood that the above embodiments are only illustrative and not restrictive in any sense. The scope and spirit of the present invention are limited only by the terms of the appended claims.

What is claimed is:

1. An access point that connects to terminals to network through a wireless LAN connection device equipped on said terminals, said access point comprising:
    a processor and a memory;
    an operation receiving unit that receives a prescribed operation;
    a detection unit that detects a status of a connection configuration required for connection to the network, when said prescribed operation is received by said operation receiving unit;
    a mode activation unit that, when the detected status of the connection configuration indicates that the connection configuration remain to be performed, activates a restricted receiving mode in which only a packet including information specific to one of said terminals is accepted as an initial configuration packet, wherein said information specific to said one terminal is obtained by relying on said terminal as terminal-specific information;
    a terminal identification unit that, when said initial configuration packet sent from a first terminal among said terminals is received while the restricted receiving mode is active, identifies the first terminal that sent the initial configuration packet based on said terminal-specific information;
    an encryption key setting unit that, prior to the commencement of subsequent communications with said first terminal identified by said terminal identification unit, sets a first encryption key to be used for communications with said first terminal to a value corresponding to an encryption key set in said first terminal, using said terminal-specific information obtained from said terminal;
    a communication unit that performs wireless communication with said first terminal while decoding wireless communication data using said first encryption key;
    an encoded data receiving unit that, following the setting of the first encryption key, when an initial configuration packet, that includes a second terminal-specific information specific to a second terminal among said terminals, is sent from said second terminal, for which an encryption key used for communications with said access point has not yet been set, receives additional registration data, that includes said second terminal-specific information for said second terminal is sent from said first terminal that received said initial configuration packet, after being encoded using the first encryption key that is already set and used for communications between said access point and said first terminal, receives said additional registration data;
    an additional terminal identification unit that decodes the received additional registration data using the encryption key set by said encryption key setting unit and identifies said second terminal that sent said initial configuration packet based on said second terminal-specific information included in the decoded additional registration data; and
    an additional setting unit that, prior to communication with said identified second terminal, sets a second encryption key to be used for communications with said second terminal to a value corresponding to an encryption key set in said second terminal using said terminal-specific.

2. The access point according to claim 1, wherein said restricted receiving mode is a mode in which said access point stands by for the initial configuration packet without issuing beacon signals used for position confirmation.

3. The access point according to claim 1 further comprising a display unit that provides a visual display that said restricted receiving mode is active.

4. The access point according to claim 1 further comprising:
    a mode switching unit that, following the encryption key setting, switches the active mode from said restricted receiving mode to a wireless communication mode that said access point communicates with said first terminal; and
    a connection configuration unit that, following switching to said wireless communication mode, when connection configuration data pertaining to the settings for connection to the network is transmitted while encoded using the encryption key set in said first terminal, receives said connection configuration data, decodes said connection configuration data using the first encryption key set by said encryption key setting unit and configures the network connection for said first terminal based on the decoded connection configuration data.

5. The access point according to claim 1 further comprising:
    an additional connection configuration unit that, following the setting of the encryption key by said additional setting unit, when connection configuration data pertaining to the settings for connection to the network is sent from said second terminal after being encoded using the encryption key set in said second terminal, receives this connection configuration data, decodes said connection configuration data using the second encryption key set by said additional setting unit and executes the connection configuration for said second terminal based on the decoded connection configuration data.

6. The access point according to claim 1,
wherein said initial configuration packet sent from a terminal has been encoded using a temporary encryption key used temporarily, and
said terminal identification unit further comprising:
a storage unit that stores in advance a provisional key used to decode the encoded initial configuration packet, the provisional key corresponds to said temporary encryption key; and
an information retrieval unit that receives an initial configuration packet from said first terminal that is encoded by a temporary key, retrieves said terminal-specific information contained said the initial configuration packet by decoding said initial configuration packet using the stored provisional key.

7. The access point according to claim 1, wherein the value of the first encryption key set by said encryption key setting unit is determined in association with the time at which said initial configuration packet was sent from said first terminal.

8. The access point according to claim 1, wherein the value of the second encryption key set by said additional setting unit is determined in association with the time at which said initial configuration packet was sent from said second terminal.

9. An encryption key setting system comprising one or more processors, wherein said encryption key setting system is operable to set in an access point comprising: a wireless LAN transponder and one terminal of terminals equipped a wireless LAN connection device, an encryption key used for encoding in advance the wireless communication data transmitted wirelessly between said access point and said terminal, wherein:
said terminal comprises:
a transmission unit that wirelessly transmits an initial configuration packet including information specific to said terminal based on a prescribed instruction issued from said terminal; and
a setting unit that, after the transmission of said initial configuration packet by said transmission unit but prior to communication with said access point, sets the encryption key to be used for communications with said access point to a prescribed value based on said terminal-specific information, and
said access point comprises:
an operation receiving unit that receives a prescribed operation;
a detection unit that detects a status of a connection configuration required for connection to the network, when said prescribed operation is received by said operation receiving unit;
a mode activation unit that, when the detected status of the connection configuration indicates that the connection configuration remain to be performed, activates a restricted receiving mode in which only a packet including information specific to a terminal is accepted as an initial configuration packet, wherein said information specific to said one terminal is obtained from said terminal as terminal-specific information;
a terminal identification unit that, when said initial configuration packet sent from a first terminal among said terminals is received while the restricted receiving mode is active, identifies the first terminal that sent the initial configuration packet based on said terminal-specific information; and an encryption key setting unit that, prior to the commencement of subsequent communications with said first terminal identified by said terminal identification unit, sets a first encryption key to be used for communications with said first terminal to a value corresponding to an encryption key set in said first terminal, using said terminal-specific information obtained from said terminal;
wherein said terminals include a first terminal for which the first encryption key valid between said terminal and said access point is already set and a second terminal for which an encryption key valid between said terminal and said access point is not yet set,
said first terminal further comprises:
a packet receiving unit that receives an initial configuration packet that was sent from said second terminal and includes information specific to said second terminal as second terminal-specific information; and
an additional registration data transmission unit that, following the receipt of said initial configuration packet, transmits to said access point additional registration data that includes said second terminal-specific information after encoding said data using the encryption key valid between said first terminal and said access point, and
said access point further comprises:
an additional terminal identification unit that receives said additional registration data, decodes said data using the first encryption key, and identifies said second terminal that sent said initial configuration packet based on said second terminal-specific information included in the decoded additional registration data; and
an additional setting unit that, prior to communication with said identified second terminal, sets a second encryption key used for communications with said second terminal to a value corresponding to an encryption key set in said second terminal, using said second terminal-specific information.

10. The encryption key setting system according to claim 9, wherein the transmission of the initial configuration packet by said transmission unit is executed when a prescribed program is booted on said terminal.

11. The encryption key setting system according to claim 9, wherein said second terminal comprises an additional connection configuration data transmission unit that, after said additional setting unit in said second terminal sets the second encryption key for communication with said second terminal, transmits connection configuration data pertaining to the network connection settings while encoding the data using the encryption key set in said second terminal and,
said access point further comprises an additional connection configuration unit that receives said connection configuration data sent from said second terminal, decodes said connection configuration data using the second encryption key set by said additional setting unit and executes the connection configuration for said second terminal based on the decoded connection configuration data.

12. A method for setting in an access point comprising a wireless LAN transponder and one terminal of terminals equipped a wireless LAN connection device an encryption key used to encode in advance the wireless communication data transmitted wirelessly between said access point and said terminal, the method comprising:
on the side of said terminal,
wirelessly transmitting an initial configuration packet that includes information specific to said terminal based on a prescribed instruction, wherein said information specific to said one terminal is obtained from said terminal as terminal-specific information; and setting the encryption key to be used for communications with said access point to a prescribed value based on said terminal-specific information obtained from said terminal, after the transmission of said initial configuration packet but prior to communication with said access point, and on the side of said access point, detecting a status of a connection configuration required for connection to the network, when a prescribed operation is received;

activating a restricted receiving mode in which only a packet including information specific to a terminal is accepted as an initial configuration packet, when the detected status of the connection configuration indicates that the connection configuration remain to be performed;

identifying the first terminal that sent the initial configuration packet based on said terminal-specific information, when said initial configuration packet sent from a first terminal among said terminals is received while the restricted receiving mode is active;

setting a first encryption key to be used for communications with said first terminal to a value corresponding to an encryption key set in said first terminal, using said terminal-specific information prior to the commencement of subsequent communications with said first terminal identified by said terminal identification unit;

providing the first terminal for which the first encryption key valid between said terminal and said access point is already set and a second terminal for which a second encryption key valid between said terminal and said access point is not yet set;

sending an initial configuration packet including second terminal-specific information specific to said second terminal from said second terminal to said first terminal;

transmitting an additional registration data that includes said second terminal-specific information specific to said second terminal to said access point using said initial configuration packet, after encoding said data using the first encryption key valid between said first terminal and said access point;

decoding said additional registration data using the first encryption key set in said access point, and identifying said second terminal that sent said initial configuration packet based on said second terminal-specific information included in the decoded additional registration data; and in said access point, setting second encryption key used for communications with said second terminal to a value corresponding to an encryption key set in said second terminal using said second terminal-specific information, prior to communication with said identified second terminal.

13. The encryption key setting method according to claim 12, wherein the second terminal transmits, following the setting of the second encryption key in said access point, connection configuration data pertaining to the network connection settings while encoding the data using the encryption key set in said second terminal, and said access point receives this connection configuration data, decodes said connection configuration data using the encryption key set in said access point and executes the connection configuration for said second terminal based on the decoded connection configuration data.

14. A computer readable recording medium storing at least executable computer program code for performing the method recited in the claim 12.

15. The encryption key setting method of claim 9, wherein said terminal specific information includes a transmission time and at least one member from the group consisting of a MAC address, a CPU ID, and a random number.

16. The encryption key setting method of claim 12, wherein said terminal specific information includes a transmission time and at least one member from the group consisting of a MAC address, a CPU ID, and a random number.

17. The access point of claim 1, wherein said terminal specific information includes a transmission time and at least one member from the group consisting of a MAC address, a CPU ID, and a random number.

18. The encryption key setting system of claim 9, further comprising a wireless transponder having a wireless transmitter and receiver.

19. The access point of claim 1, further comprising a wireless transponder having a wireless transmitter and receiver.

* * * * *